United States Patent [19]

Bruesselbach et al.

[11] Patent Number: 4,821,272

[45] Date of Patent: Apr. 11, 1989

[54] SINGLE MIRROR INTEGRAL RAMAN LASER

[75] Inventors: Hans W. Bruesselbach, Santa Monica; Donald R. Dewhirst, Torrance, both of Calif.

[73] Assignee: Hughes Aircraft Co., Los Angeles, Calif.

[21] Appl. No.: 924,108

[22] Filed: Oct. 31, 1986

Related U.S. Application Data

[63] Continuation of Ser. No. 667,191, Nov. 1, 1984, abandoned.

[51] Int. Cl.[4] .............................................. H01S 3/30
[52] U.S. Cl. ................................... 372/3; 372/19; 307/426
[58] Field of Search ................ 372/3, 19, 71; 307/426

[56] References Cited

U.S. PATENT DOCUMENTS 4,144,464  3/1979  Loree et al. ........................ 307/88.3

FOREIGN PATENT DOCUMENTS 0063205  10/1982  European Pat. Off. .

Primary Examiner—William L. Sikes
Assistant Examiner—Robert E. Wise
Attorney, Agent, or Firm—Duraiswamy V. D.; A. W. Karambelas

[57] ABSTRACT

A Raman laser (10) is provided using a pump laser (22) as a source of radiation at a first wavelength and a Raman cell (30) for converting the first wavelength radiation to a second wavelength. The pump laser (20) provides polarized radiation at a predetermined first wavelength which is focused by a focusing means (40) into a Raman medium (32) which converts radiation at the first wavelength to a predetermined second wavelength by Raman scattering processes. A reflection means (50) which is aligned normal to the first wavelength radiation is disposed between the pump laser (20) and focusing means (40). The reflection means is substantially 100% reflective of radiation at the second wavelength and substantially non-reflective of radiation at the first wavelength. A polarizing means (70) and quarter-wave plate (60) are disposed along the optical path between the Raman medium (32) and the pump laser (20) for allowing propagation of the first wavelength to the Raman medium (32) but preventing SBS radiation from entering the pump laser (20) from the Raman medium.

Alternatively, the pump laser includes an output reflection means (124) that is substantially 100% reflective of radiation at the second wavelength and partially reflective of radiation at the first wavelength. This embodiment achieves automatic alignment of the pump laser and the Raman medium (32) and does not use additional reflection means, polarization means, or a quarter-wave plate.

15 Claims, 1 Drawing Sheet

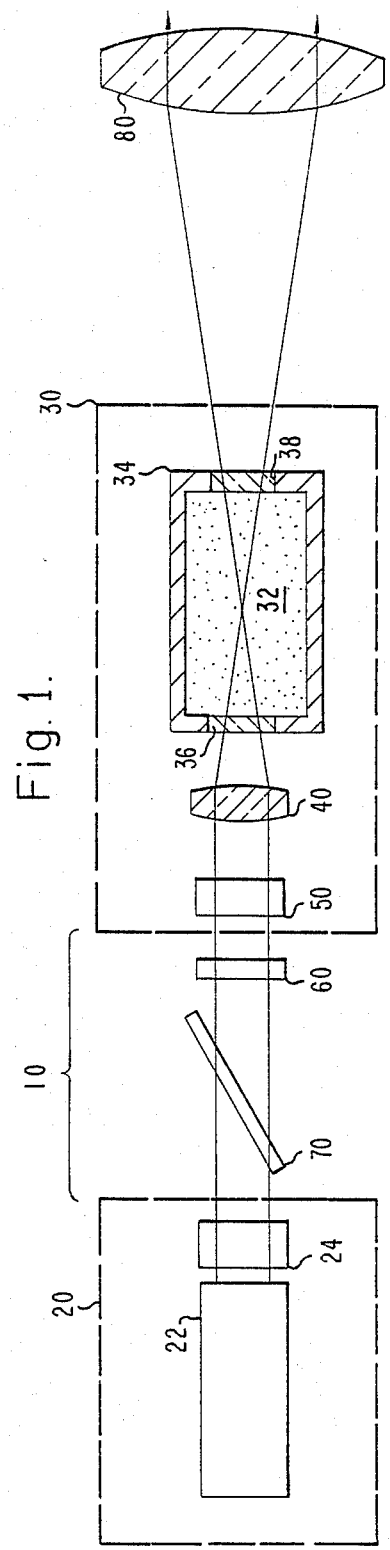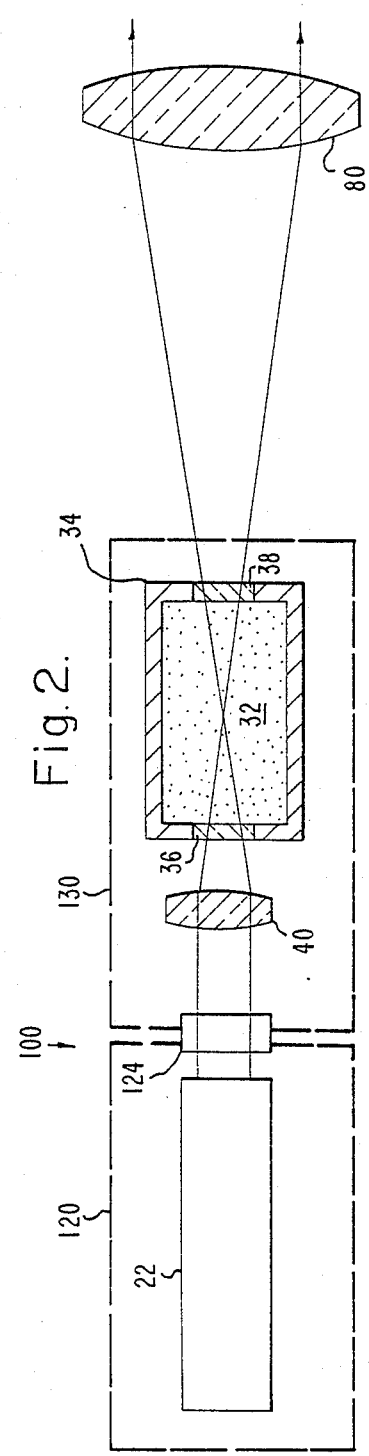

SINGLE MIRROR INTEGRAL RAMAN LASER

This application is a continuation of application Ser. No. 06/667,191, filed Nov. 1, 1984, now abandoned.

BACKGROUND OF THE INVENTION

This invention relates to lasers and more particularly to Raman lasers or Raman cells driven by laser sources. The invention further relates to Nd:YAG driven Raman lasers.

Advanced ranging or tracking devices use reflected light from a laser source in order to ascertain target and range data for many applications. It is obviously desirable to operate such devices at wavelengths which are considered "eye-safe" in order to reduce risk to personnel encountering the direct or reflected beams of laser light.

The term "eye-safe" is applied to radiation that does not, in general, cause tissue damage to the human eye. It is known that for wavelengths between 400 and 1400 nanometers, radiation tends to cause retinal damage; while for wavelengths longer than 1400 nanometers, the radiation is absorbed within or near the surface of the cornea and much higher levels of radiation can be tolerated before reaching the level that can cause corneal damage.

Research in the area of laser safety has led to the development of specific standards for "eye-safe" lasers. The "Regulations for the Administration and Enforcement of the Radiation Control for Health and Safety Act of 1968", published by the U.S. Department of Health, generally supports the wavelength of 1.54 $\mu$m as the standard for "eye-safe." The standards for lasers operating at this wavelength allow several orders of magnitude greater output energy and power than for non "eye-safe" lasers.

Raman lasers utilizing a Raman scattering medium can be used to convert laser radiation of one wavelength to a longer wavelength. This allows lasers operating at non "eye-safe" wavelengths to produce radiation within the "eye-safe" wavelength region.

For example, by using methane with a frequency shift of 2916 cm$^{31}$, a Nd:YAG laser operating at a wavelength of 1.06 $\mu$m can have its output converted to the "eye-safe" 1.54 $\mu$m wavelength. The 1.06 $\mu$m laser radiation is coupled into a resonator containing the methane Raman medium and produces scattered radiation at the 1.54 $\mu$m wavelength.

Raman shifted lasers such as those described in U.S. Pat. Nos. 4,103,179, issued to W. Schniedt, and 3,668,420 issued to J. T. Vanderslice use a Raman cell resonator to convert 1.06 $\mu$m wavelength radiation from a pump laser to 1.54 $\mu$m. The Raman resonator of each of these patents has a pressurized gas medium disposed along an optical path between two mirrors. One mirror, the input mirror, is substantially totally transmissive at 1.06 $\mu$m and substantially totally reflective at 1.54 $\mu$m. This allows 1.06 $\mu$m radiation to enter the cell but does not allow 1.54 $\mu$m radiation back into the pumping laser. The second mirror, the output mirror, is partially reflective at 1.54 $\mu$m and substantially totally reflective at 1.06 $\mu$m. This configuration allows the output of 1.54 $\mu$m radiation from the Raman resonator but traps the 1.06 $\mu$m pumping radiation. However, this Raman resonator technique is not without its limitations.

The Raman scattering process is intensity dependent. Therefore, any decrease in pump radiation intensity lessens the conversion efficiency of radiation to the new wavelength. Improper alignment, spacing or curvature of the mirrors in the Raman cell resonator causes the radiation to diverge from central axis or degrade the focus within the Raman cell. This in turn lowers the intensity and thus decreases conversion. The Raman resonator formed by mirrors also needs to be precisely aligned with the pump laser and associated optics to insure optimum radiation transfer into the Raman resonator and maintain maximum pump intensity along the focused optical path.

In addition, other scattering processes such as Stimulated Brilluoin Scattering (SBS) can greatly decrease the wavelength conversion efficiency. The SBS radiation returns through the Raman medium and the input mirror to the pump laser. Large enough amounts of radiation returning to the pump laser causes operational problems or damage.

SBS normally occurs to some extent within the Raman medium but is greatly enhanced for misaligned optics. The SBS and Raman scattering processes are in direct competition within the medium. The threshold for onset of stimulated Raman scattering (SRS) must be below the SBS threshold so that SRS occurs first, and energy is depleted from the medium by transfer into radiation at the desired Raman wavelength. However, misaligned optics increase the SRS threshold by detuning the Raman resonator and by causing non-overlapping paths for the incident pump radiation and Raman scattered radiation.

The SBS is reflected back into the pump laser and can damage the pump laser or severely impact on its performances.

What is needed is a method and apparatus to ensure good alignment of the driver laser and Raman cell and simplification of the overall Raman laser.

SUMMARY

Accordingly, the present invention provides a Raman laser apparatus having the advantage of automatic alignment between the pump laser and Raman medium. Additionally, the invention provides improved efficiency and simplified optics.

These and other advantages are realized in a Raman laser using a pump laser for producing a predetermined wavelength of polarized radiation and a Raman medium for wavelength conversion. The pump laser uses an output reflection means partially reflective of the polarized radiation as an output interface.

An enclosure with input and output windows containing a Raman medium is positioned along the optical path of the pump laser output radiation. A focusing means is positioned adjacent to the Raman medium for focusing radiation from the pump laser into the Raman medium.

A second reflection means is positioned on the pump laser side of the focusing means and is substantially totally reflective of 1.54 $\mu$m radiation but substantially non-reflective of 1.06 $\mu$m radiation. A polarizer and quarter-wave plate are positioned between the second reflection means and the output reflection means to prevent return of SBS radiation from the Raman medium into the pump laser.

In a second embodiment, the output reflection means of the pump laser is partially reflective of 1.06 $\mu$m radiation and substantially totally reflective of 1.54 $\mu$m radiation. In addition, a collimating means can be positioned adjacent to the output window of the Raman medium enclosure for collimating 1.54 μm radiation produced in the Raman laser.

BRIEF DESCRIPTION OF THE DRAWINGS

FIG. 1 is schematic view of a Raman laser according to the invention.

FIG. 2 is a schematic view of another embodiment of a Raman laser of the invention.

DETAILED DESCRIPTION OF THE INVENTION

We have constructed a new Raman laser without the use of a conventional resonator around the Raman medium. With pump laser radiation input at one end of a Raman medium, Raman shifted output is obtained at the other end without reflectors on both ends of the optical path through the Raman medium.

Referring now to FIG. 1, Raman laser 10 employs a pump laser 20 as a source of substantially monochromatic polarized radiation. Pump laser 20 comprises many elements (not shown) known in the art and uses one of several known lasing media. For purposes of clarity, the preferred embodiment is described using a Nd:YAG laser operating at 1.064 μm (1064 nm), although it will become apparent to one skilled in the art that other laser materials and wavelengths can be used.

The Nd:YAG medium 22 of pump laser 20, is typically positioned between two reflection means (one shown as 24) forming an optical resonator. In this arrangement, the output occurs through one reflection means 24, which is partially reflective of radiation at 1.06 μm. Reflection means 24 can be an optical quality plate with a reflective coating, a polished mirror or other means known in the art.

The preferred embodiment for reflection means is an optical quality glass plate having a partially reflective coating on one side. Generally, laser output reflectors are constructed with an anti-reflection coating on the outer surface and the reflective coating on the other. However, the coating location can be reversed. The only requirement is that a sufficient amount of radiation be confined within laser 20 to support the laser oscillation. Typically, the reflective coating on reflection means 24 is approximately 30% reflective of 1.06 μm radiation for a Nd:YAG laser.

To achieve the high intensity required of pump laser 20, an optical Q-switch is included in the optical resonator. The Q-switch (not shown) can be a saturable or bleachable dye cell, or other means known in the art, which is optically bleached to achieve transparency at predetermined energy densities or optical intensities. Therefore, energy builds up in the pump laser resonator until the Q-switch becomes optically transparent at which time the resonator Q greatly increases and a high peak power pulse is produced.

In the preferred embodiment, the 1.06 μm radiation exiting pump laser 20 through output reflection means 24 is directed to a Raman cell 30 for conversion to 1.54 μm. Raman cell 30 employs a Raman medium 32 such as, but not limited to, pressurized methane confined within an enclosure 34 having input and output windows 36 and 38, respectively.

The efficiency for the conversion of 1.06 μm radiation to 1.54 μm by scattering processes within enclosure 34, is dependent on the intensity of the incident radiation $I_i$, (from pump laser 20) the gain of the Raman medium, g, and the length, L, of the interaction zone in Raman medium 32. These factors are generally related by the expression:

$$I_t = I_o e^{g I_i L} \quad (1)$$

where $I_t$ is the transmitted/converted intensity and $I_o$ is a very low level intensity output due to thermal conversion in the medium.

Raman lasers, such as those of Schmidt and Vanderslice, use mirrors adjacent to the input and output windows, to create multi-pass resonators within the Raman medium in enclosure 34. This is done to increase $I_t$ by increasing factors on the right side of Equation (1). Radiation is concentrated along a narrow beam path by concave mirrors to increase $I_i$ and given a multi-pass path within the Raman medium to increase L.

However, an efficient Raman laser can be constructed without the use of such a resonator for Raman medium 32. For a two- or threefold increase in the intensity of the incident optical radiation, $I_i$, no reflective surface is needed adjacent to output window 38 of Raman cell 30. However, high efficiency is difficult to obtain because of competing nonlinear effects.

In the preferred embodiment, the factors on the right side of Equation (1) are increased by using a lens and a single reflector. A lens 40 is positioned adjacent the input window 36 of enclosure 34. Alternatively, lens 40 replaces window 36 itself. This lens focuses radiation from pump laser 20 into enclosure 34 and increases the intensity of the incident radiation at its focal point. Near the focal point of lens 40, along the direction of propagation, for some threshold of input energy the radiation intensity is sufficiently high to support Raman scattering and efficiently produce wavelength conversion. However, below this threshold input beam energy, radiation deposited in this region of enclosure 34 is not efficiently converted to the new wavelength. The input energy threshold can be reduced with a longer interaction length to increase the gain. Therefore, a reflection means 50 is provided to create such a longer interaction zone.

Reflection means 50 is positioned adjacent lens 40 on the pump laser side of enclosure 34. Reflection means 50 can be, but is not limited to, an optical flat quality glass plate having a coating reflective at 1.54 μm. The reflective coating, not shown, on reflection means 50 can reside on either side as in the case of reflection means 24. The only limitation is that reflection means 50 is preferred to be substantially totally reflective of radiation at the converted wavelength of 1.54 μm and substantially non-reflective of 1.06 μm radiation.

There generally exists some thermal noise and spontaneous Raman scattering in Raman medium 32 which give rise to the $I_o$ term of Equation (1). The thermal noise results from some degree of conversion of local molecular vibrational energy into the wavelength of interest (1.54 μm). Such natural radiation exists throughout Raman medium 32. Some thermal noise and/or spontaneous scattered radiation propagates from a region on the output side of enclosure 34 toward lens 40 through the high gain interaction zone in the lens 40 focal region. Here the existing radiation encounters pump laser radiation resulting in stimulated converted radiation at 1.54 μm coherently reinforcing the existing radiation and forming a 1.54 μm beam propagating toward input window 36 and lens 40.

The 1.54 μm radiation propagates through lens 40 where it encounters reflection means 50 which reflects the radiation back through lens 40 and enclosure 34. On the return pass through enclosure 34 the radiation stimulates the conversion of more incident pump laser radiation to the 1.54 μm wavelength. The converted radiation then propagates as an in-phase 1.54 μm laser beam out of enclosure 34 through output window 38 and is collimated by conventional collimating means 80, positioned adjacent to output window 38.

The power required for the wavelength conversion of radiation from pump laser 20 depends on the nature of the Raman medium and pump laser but for purposes of this embodiment, the pump laser produces energy in the range of a few megawatts.

The above embodiment can still suffer from the previously described misalignment complications. Therefore, a polarizer 70 and quarter wave plate 60 combination, as known in the art, are used to prevent SBS radiation from re-entering pump laser 20.

Polarizer 70 transmits the already polarized radiation from pump laser 20. Quarter-wave plate 60 is oriented to divide polarized radiation from pump laser 20 into two equal components and shift this phase by 90° to produce circularly polarization. SBS radiation reflected back through quarter-wave plate 60 undergoes a second 90° phase shift to become the orthogonal polarization to that of pump laser 20 and is reflected out of the optical path by polarizer 70. Therefore, the combination of polarizer 70 and quarter-wave plate 60; as known in the art, allows polarized pump laser radiation to propagate to Raman cell 30 but prevents SBS from re-entering pump laser 20. This process establishes isolation of the pump laser from SBS radiation previously described.

To further decrease alignment and SBS problems, an alternate embodiment of the invention is presented. Referring now to FIG. 2, Raman laser 100 uses a pump laser 120 and a Raman cell 130 arranged in the same manner as pump laser 20 and cell 30 of the previous embodiment. Laser medium 22, Raman medium 32, enclosure 34, windows 36 and 38, and lens 40 have the same functions as the corresponding parts in the previously described embodiment. However, output reflection means 24 is replaced by output reflection means 124, and reflection means 50, polarizer 70 and quarter-wave plate 60 are not used.

Reflection means 124 has a reflective coating on one surface which is partially reflective of pump laser radiation, in this case, 1.06 μm wavelength, and substantially 100% reflective of the wavelength radiation produced in Raman cell 30, here 1.54 μm. The reflective coating on reflection means 124 can reside on either side of means 124.

The result of this arrangement is that the function of reflecting corrected radiation from enclosure 34 back through enclosure 34 is performed by the output reflector for pump laser 20. Therefore, whatever the alignment of Raman cell 130 relative to pump laser 120, radiation transferred through lens 40 into enclosure 34 and converted to the new Raman wavelength, as previously described, returns through lens 40 along substantially the same path.

The converted wavelength radiation is then reflected by reflection means 124 back into enclosure 34 where it enhances conversion as previously described. Because the radiation will always cover a closely identical path, automatic alignment of the optics is achieved and the Raman process is very efficient and dominates over SBS. Therefore, very little SBS radiation exists or is reflected toward pump laser 20, eliminating the problem of damage to the pump laser.

EXAMPLE I

A Nd:YAG pump laser 20 producing a 50 millijoule output beam of Q-switched 1.06 μm radiation was used to drive a Raman cell 30 containing pressurized methane gas and having a reflection means 50 adjacent to a lens 40 as per the embodiment of FIG. 1. The energy output of the Raman laser was 14 millijoules of 1.54 μm radiation.

EXAMPLE II

The second embodiment, described above, was also tested with reflection means 50 removed and a reflective, optically flat, surface used as part of the output of pump laser 20. This configuration produced 21 millijoules of 1.54 μm radiation from the 50 millijoule beam of 1.06 μm radiation. Therefore, the second embodiment of the invention represents a 50 percent increase in efficiency over the first embodiment, and in addition has the advantage of the automatic alignment described above.

Practicing the method and apparatus of the invention provides a Raman laser with improved efficiency and automatic alignment of the pump laser and Raman cell. There is decreased complexity for the optics and a compact unitary structure arises.

For purposes of clarity and in keeping with the primary intended application to which the invention is directed, the preferred embodiments have been described using a gaseous Raman medium such as methane. However, the Raman medium employed can be one of several gases, liquids or solids that are known to produce SRS radiation at desired wavelengths. Examples of other Raman media include carbon monoxide, hydrogen, deuterium, ammonia and a variety of glasses. The specific media employed is determined by the desired output wavelength, the laser source wavelength, allowable complexity, and power requirements. The method and apparatus of the present invention provides an improved Raman laser for a variety of Raman media.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A Raman laser comprising:
   a pump laser for producing radiation at a predetermined first wavelength comprising a lasing medium disposed in a resonant optical cavity having a reflector that is partially reflective of said pump laser radiation,
   a Raman medium disposed along the optical path of said pump laser radiation, for converting the wavelength of said pump laser radiation to a predetermined second wavelength by Raman scattering processes, and focusing means disposed between said pump laser and said Raman medium and positioned suitably adjacent to said Raman medium for focusing said pump laser radiation into said Raman medium, without an isolator between said reflector and said focusing means, said reflector also being substantially 100% reflective of said second wavelength radiation and being positioned between said lasing medium and said focusing means, and aligned relative to said focusing means and said Raman medium so as to enhance wavelength conversion and substantially avoid feedback damage to said pump laser without an isolator.

2. A Raman laser as recited in claim 1 wherein said lasing medium comprises an optically pumped Nd:YAG medium.

3. A Raman laser as recited in claim 1 wherein said first wavelength is 1.06 $\mu$m.

4. A Raman laser as recited in claim 1 wherein said second wavelength is 1.54 $\mu$m.

5. A Raman laser as recited in claim 1 further comprising an enclosure surrounding said Raman medium, said enclosure having input and output windows for the passage of radiation.

6. A Raman laser as recited in claim 5 wherein said Raman medium comprises a pressurized gas selected from the group consisting of deuterium, hydrogen or methane.

7. A Raman laser as recited in claim 5 wherein said Raman medium comprises pressurized methane.

8. A Raman laser as recited in claim 1 wherein said output reflective means is a dielectric coated optically flat glass plate.

9. A Raman laser as recited in claim 1 wherein said focusing means is a convex lens.

10. A Raman laser as recited in claim 1 further comprising collimating means positioned adjacent said Raman medium for forming a collimated laser beam from radiation at said second wavelength.

11. A Raman laser comprising:
a pump laser for producing radiation at a predetermined first wavelength comprising a lasing medium disposed in a resonant optical cavity;
a Raman cell disposed along the optical path of said first wavelength radiation from said pump laser for converting the wavelength of said first wavelength radiation to a predetermined second wavelength by Raman scattering processes;
a reflector positioned between said lasing medium and said Raman cell, said reflector being substantially 100% reflective of said predetermined second wavelength radiation and partially reflective of said first wavelength radiation, for transmitting said first wavelength radiation from said pump laser towards said Raman cell, and for reflecting radiation at said predetermined second wavelength, propagating from said Raman medium towards said pump laser, back towards said Raman cell,
said Raman cell having an enclosure with input and output windows and a Raman medium disposed within the enclosure,
said input window acting as a focusing lens for focusing said first and second wavelength radiation into said Raman medium so that Raman scattering is supported in said Raman medium without a second reflector, and absent an isolator between said reflector and said focusing lens,
said reflector and said Raman cell being aligned so as to eliminate the need for separate isolation means.

12. A Raman laser as recited in claim 11 wherein said reflector is an optically flat glass plate with two sides having a reflective coating on either one of said two sides, said reflective coating being partially reflective of said first wavelength radiation and substantially 100% reflective of said second wavelength radiation, and said reflector is aligned relative to said Raman cell so that said first and second wavelength radiation follow substantially identical paths, in oscillating between said reflector and said Raman medium, irrespective of the alignment of said Raman medium relative to said pump laser, whereby desired wavelength conversion by Raman scattering processes is enhanced.

13. A Raman laser comprising:
a pump laser, for providing radiation at a first wavelength, having an output reflector;
a Raman medium disposed along the optical path of said first wavelength radiation from said pump laser for converting the wavelength of said first wavelength radiation to a predetermined second wavelength by Raman scattering processes;
focusing means disposed between said output reflector and said Raman medium and positioned adjacent said Raman medium for focusing said first wavelength radiation into said Raman medium;
said output reflector being partially reflective of said first wavelength radiation so as to transmit said first wavelength radiation from said pump laser towards said Raman medium, and substantially 100% reflective of said second wavelength radiation so as to act as a Raman reflector for said Raman medium and reflect said second wavelength radiation propagating along a first path from said Raman medium towards said pump laser, back towards said Raman medium along a second path, and absent separate isolation means between said output reflector and said focusing means,
said output reflector being aligned adjacent said focusing means so that, irrespective of the alignment of said Raman medium and said pump laser, said first and second paths are substantially identical so as to improve wavelength conversion and reduce undesired backscattered radiation so as to eliminate the need for separate isolation means.

14. A Raman laser apparatus for wavelength conversion of 1.06 $\mu$m radiation to 1.54 $\mu$m radiation comprising:
a Q-switched pump laser for providing 1.06 $\mu$m radiation;
a reflector with two opposed surfaces having a reflective coating on either one of the two opposed surfaces, said reflective coating being partially reflective of 1.06 $\mu$m radiation and substantially 100% reflective of 1.54 $\mu$m radiation;
focusing lens, disposed adjacent said reflector such that said reflector is positioned between said pump laser and said focusing lens, for transmitting and focusing the 1.06 $\mu$m radiation transmitted by said reflector and without a polarizer and quarter-wave plate disposed between said focusing lens and said reflector;
a Raman medium disposed within an enclosure, said enclosure disposed along the path of said 1.06 $\mu$m radiation focused by said focusing lens, said 1.06

μm radiation being brought to a focus region within said Raman medium;

said Raman medium being stimulated by the 1.06 μm radiation so as to produce converted radiation at 1.54 μm, and being aligned with respect to said reflector and focusing lens so as to increase desired wavelength conversion and reduce undesired backscattering irrespective of the alignment of said Raman medium relative to said pump laser.

15. A method for laser wavelength conversion, comprising the steps of:

exciting a lasing medium to produce pump laser radiation at a first wavelength;

passing said pump laser radiation, along a first path, first through a reflector which is partially reflective of said pump laser radiation, and second through a lens which focuses said pump laser radiation to a focus within a Raman medium, without a polarizer and quarter-wave plate between said reflector and said lens, stimulated conversion of said pump laser radiation to a second wavelength occurring in said Raman medium, and reinforcing said stimulated conversion of said pump laser radiation by:

passing said second wavelength radiation back through said lens along a second path;

then reflecting said second wavelength radiation, from said reflector which is substantially 100% reflective of said second wavelength radiation, along a third path back through said lens and into said Raman medium, and aligning said reflector, lens and said Raman medium so that said first, second and third paths are substanatially identical so as to reduce undesired scattered radiation to enhance desired wavelength conversion.

* * * * *